Patented Oct. 2, 1928.

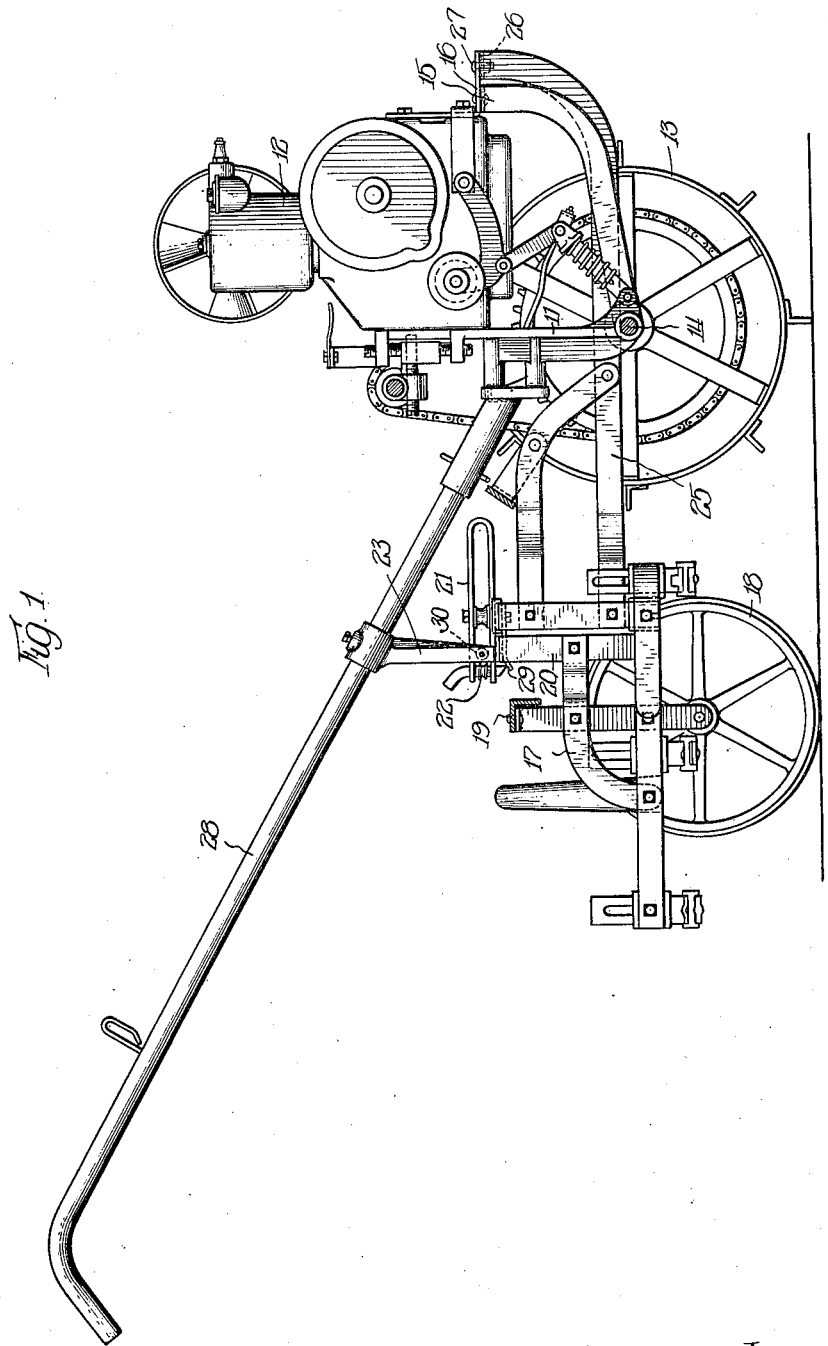

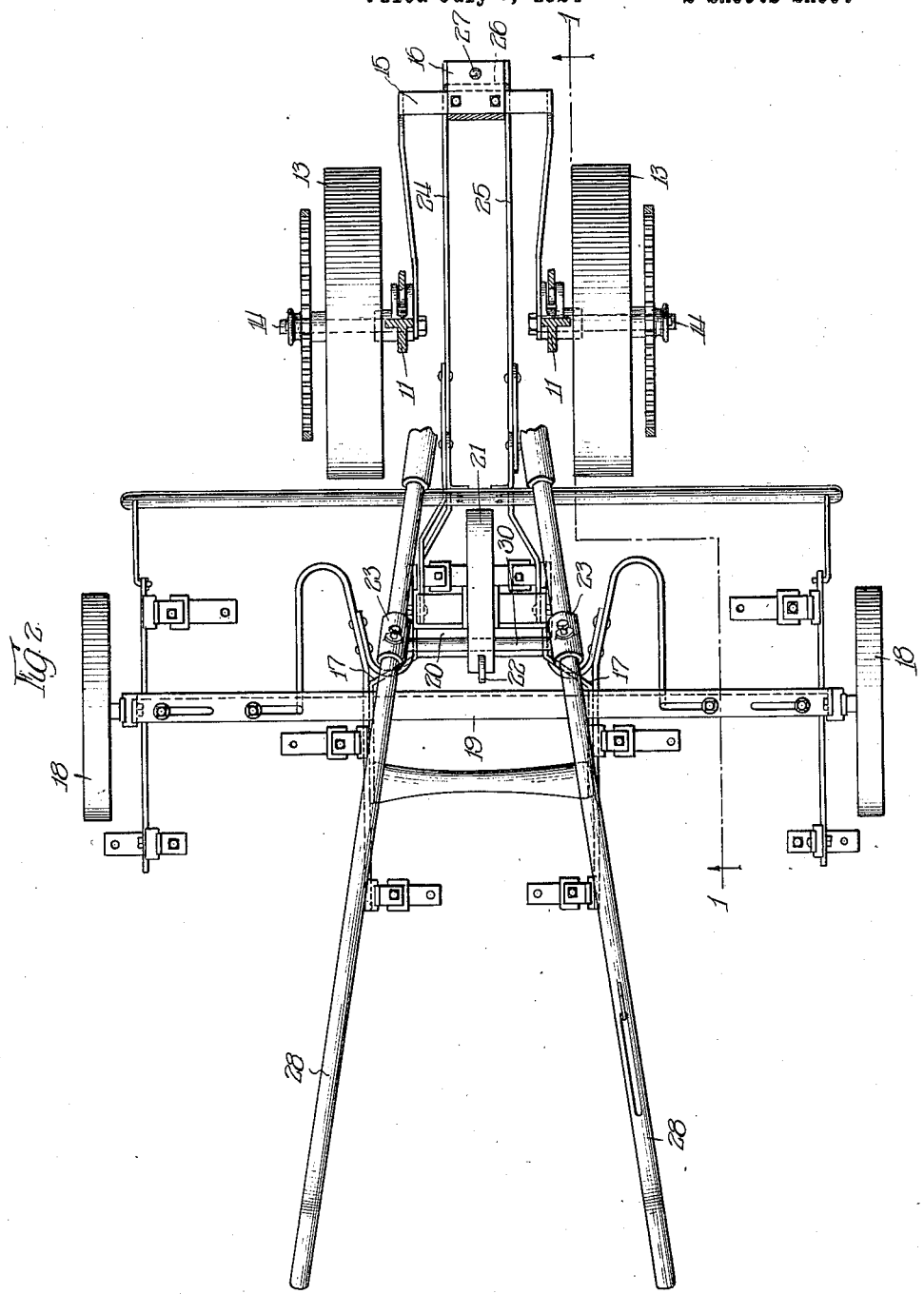

1,685,968

UNITED STATES PATENT OFFICE.

CHARLES J. TRAVERS, OF PORT WASHINGTON, WISCONSIN, ASSIGNOR TO GILSON MANUFACTURING COMPANY, OF PORT WASHINGTON, WISCONSIN, A CORPORATION OF WISCONSIN.

TRACTOR AND HITCH CONSTRUCTION.

Application filed July 3, 1924. Serial No. 723,854.

This invention relates to a new and improved tractor and hitch construction and more particularly to a hitch associated with a tractor in such manner that the hitch changes direction in the same direction and simultaneously with the tractor.

The invention relates particularly to tractors of the kind having a single pair of ground engaging driving and steering means and having a ground working hitch drawn behind the steering and driving means. A specific form of such tractors is the two-wheeled light tractor which is manipulated by an operator walking behind the tractor. Tractors of this type are commonly used for light cultivating work as, for example, cultivating rows of corn or other plants after the plants are some distance above the ground. The tractor mechanism is adapted to straddle the row of plants and to drag the cultivating means working upon the ground upon each side of the row.

With machines of this type, careful and accurate steering is necessary since the plants must be avoided both by the tractor mechanism and by the ground working apparatus. This is very difficult where the ground working hitch is pivoted to the rear portion of the tractor.

This form of connection causes the wheels and ground working means of the hitch to turn in a direction opposite to that in which the tractor turns when the latter is steered. Consequently, when it is observed that the cultivating means are approaching too closely to the plants, a steering movement adapted to move the means immediately away from the plants would direct the tractor wheels towards the plants or vice versa.

It is an object of the present invention to provide a tractor and hitch so related that the hitch is steered simultaneously and in the same direction with the tractor.

It is a further object to provide a construction of this character in which the hitch is connected to the tractor by a single pivot whereby racking and twisting of the hitch and implements are avoided.

Other and further objects will appear as the description proceeds.

I have illustrated a preferred embodiment of my invention in the accompanying drawings, in which—

Figure 1 is an elevation of a tractor and hitch constructed according to the present invention taken on line 1—1 of Figure 2; and Figure 2 is a plan view of Figure 1, the engine and drive means being omitted.

The tractor comprises a main frame 11 upon which is supported the engine 12 which serves to drive the tractor wheels 13 through mechanism which forms no part of the present invention and therefore need not be described in detail.

The main frame 11 is provided with stub shafts 14 which carry the wheels 13. The frame is also provided with the handle bars 28 which are rigidly connected to the frame and by means of which the frame and tractor wheels are turned to steer the tractor. The main frame is provided with the forwardly extending members 15 which are connected to the pivot plate 16 at the front of the tractor and frame.

The tractor hitch frame 17 is supported upon the wheels 18 which are connected by the bar 19. The hitch frame is provided with a transverse member 20 which is retained in position upon the member 29 by means of the catch 22. The U-member 21 which carries the member 29 fits slidably upon the rod 30 which is secured to the handle bars by means of brackets 23.

The hitch is provided with a forwardly extending yoke comprising parallel members 24 and 25 which are connected by a transverse portion 26 located under the pivot plate 16 and connected thereto by pivot pin 27.

In the operation of the tractor and hitch the tractor is driven by means of the engine 12 which drives the wheels 13. It is steered by moving the handle bars 28 laterally. A movement of the handle bars to the right points the wheels 13 towards the left and the tractor will turn to the left. This movement of the main tractor frame moves the plate 16 and pivot pin 27 in an arc to the left. This movement of the pivot pin serves to swing the yoke member 26 to the left, the parallel bars 24 and 25 inclining in that direction and since these bars are substantially rigidly connected to the tractor hitch, they cause the tractor wheels 18 to be turned in the same direction as the wheels 13. A movement of the handle bars to the right similarly inclines the wheels of the tractor and hitch in the opposite direction.

By means of this construction, the tractor and hitch are simultaneously steered in the same direction and may both be moved away or toward a row of plants being cultivated. It will be understood that the ground working implements will be connected to bar 19 and will move with that bar and with the hitch wheels 18. This form of connection gives no twisting or racking movement to the tractor hitch which swings as a unit with the tractor.

I have shown my invention applied to one particular form of tractor and hitch, but I contemplate such modifications to adapt it to other tractors and hitches as may come within the scope of the appended claims.

I claim:

1. In a power cultivator, power propelled ground engaging steering means, a main frame carried by said means, a wheeled tractor hitch, the wheels being controlled in direction by the hitch, a single pivot upon said main frame in advance of the ground engaging steering means and means connecting the hitch to said pivot, the hitch being free to swing in a horizontal plane about said pivot.

2. In a power cultivator, power propelled ground engaging steering means, a main frame carried by said means, a wheeled tractor hitch, the wheels being controlled in direction by the hitch, a single pivot located upon the longitudinal axis of the main frame and in advance of the ground engaging steering means, and a substantially rigid yoke connected to the hitch and to the pivot, the hitch being free to swing in a horizontal plane about said pivot.

3. In a power cultivator, power propelled ground engaging steering means, a main frame carried by said means, a wheeled tractor hitch, the wheels being controlled in direction by the hitch, a pivot plate extending forwardly of the main frame and of the ground engaging steering means, a yoke connected to the hitch and extending forwardly under the main frame, said yoke having a forward transverse portion located adjacent the pivot plate, and a pivot pin connecting said portion and plate.

4. In a power cultivator, power propelled ground engaging steering means, a main frame carried by said means, a tractor hitch having ground engaging wheels, the wheels being controlled in direction by the hitch, a pivot plate extending forwardly of the main frame and located in advance of the ground engaging steering means, a substantially rigid yoke connected to the hitch having spaced parallel portions extending forwardly under the main frame, a transverse portion connecting the parallel portions extending under the pivot plate and a pivot pin connecting the plate and portion.

Signed at Port Washington, Wisconsin, this 10th day of June, 1924.

CHARLES J. TRAVERS.